United States Patent [19]
Senninger

[11] Patent Number: 5,899,234
[45] Date of Patent: May 4, 1999

[54] TEST CLOSURE PLUG FOR THE TRAP BUSHING OF A CONVENTIONAL T-FITTING

[75] Inventor: Ralph B. Senninger, Lexington, Ky.

[73] Assignee: Plastic Prodution A LLC, Lexington, Ky.

[21] Appl. No.: 08/816,250

[22] Filed: Mar. 13, 1997

[51] Int. Cl.$^6$ .................................................. F16L 55/10
[52] U.S. Cl. .............................. 138/89; 138/92; 138/967
[58] Field of Search ................................. 138/89, 90, 92, 138/967, 97; 285/901; 4/653, 670, 672, 293, 295

[56] References Cited

U.S. PATENT DOCUMENTS

| | | | |
|---|---|---|---|
| 0,784,931 | 3/1905 | Duncan | 285/901 |
| 1,569,875 | 1/1926 | Nixon | 138/89 |
| 1,692,710 | 11/1928 | Spahn | 138/967 |
| 1,706,687 | 3/1929 | Zimmerman | 138/89 |
| 3,036,601 | 5/1962 | Fabian, Jr. et al. | 138/89 |
| 4,139,005 | 2/1979 | Dickey | 138/967 |
| 4,673,393 | 6/1987 | Suzuki et al. | 138/89 |
| 4,883,085 | 11/1989 | Weller et al. | 138/97 |
| 5,104,150 | 4/1992 | Bard et al. | 138/89 |
| 5,388,288 | 2/1995 | Fell, Sr. . | |

*Primary Examiner*—Denise L. Ferensic
*Assistant Examiner*—James F. Hook
*Attorney, Agent, or Firm*—Frost & Jacobs LLP

[57] ABSTRACT

A plumbing fitting comprising a test closure plug for the free end of a trap bushing mounted in the center port of a T-fitting constituting a part of a soil pipe and vent pipe assembly of a plumbing system the free end of the trap bushing is provided with an adapter having an adapter nut and washer. The washer is removed and the plug is inserted in the adapter opening. The plug is configured to close the adapter opening and make a seal therewith when held in place by the adapter nut. The plug enables pressure testing of the plumbing system or the maintenance of a head of water therein. Upon installation of a fixture with a trap, the nut is removed, the plug is removed, the adapter nut and washer are then used in common trade fashion to connect the trap to the trap bushing in fluid-tight fashion by way of a slip joint. The plug can be reused. A second embodiment of the plug can be used for the same purpose when the nut of the adapter is of the type wherein the adapter washer forms an integral one-piece part of the nut. The second embodiment of the plug can also be used with an adapter having a nut and a separate washer by mounting the washer on the plug, thereby rendering the second plug embodiment similar to the first plug embodiment.

16 Claims, 5 Drawing Sheets ized as plug for a trap bushing affixed to the
center port of a conventional T-fitting.

TEST CLOSURE PLUG FOR THE TRAP BUSHING OF A CONVENTIONAL T-FITTING

TECHNICAL FIELD

The invention relates to a test closure plug, and more particularly to such a plug for a trap bushing affixed to the center port of a conventional T-fitting.

BACKGROUND ART

In the construction of a home or building, it is usual practice to provide a T-fitting wherever a fixture of the type having a trap is to be located. The T-fitting connects a soil pipe and a vent pipe and is provided with a center port to which the trap of the fixture is connected, all as is well known in the art. In the case of a lavatory or the like, this connection is made through an appropriate hole in the wall behind which the T-fitting is located and in front of which the lavatory is mounted.

In a typical 2 ½ bath home there will usually be 10 or more T-fittings for connection to the traps of one or more lavatories, one or more showers, one or more bathtubs, a kitchen sink, a washing machine drain, and the like.

In the plumbing industry today, it is common to make piping such as soil pipe and vent pipe, and fittings such as T-fittings, traps, and the like out of plastic material. The most commonly used plastic material for such applications is acrylonitrile-butadiene-styrene (ABS) or polyvinylchloride (PVC). The present invention will be described in its application to plastic piping and fittings, but is not necessarily so limited.

It is usual practice, during construction, to install the basic plumbing well before installation of the various fixtures. As a consequence, the intermediate ports of the T-fittings will not have traps connected thereto for some time. It is therefore desirable to close and seal the intermediate ports of the T-fittings to prevent clogging of the basic plumbing with dirt and foreign material which might inadvertently enter the intermediate T-fitting ports during construction. In addition, during plumbing construction, it is frequently desirable or required to perform air tests or water tests to assure that the various joints are properly connected and are fluid-tight.

The closing and sealing of the intermediate ports of the T-fittings has been accomplished by the prior art in a number of different ways. One common approach is to insert a length of pipe through the hole in the wall and into the intermediate port of the T-fitting, permanently adhering the pipe to the intermediate port by gluing, solvent welding or the like. This provides a fluid-tight connection. This pipe will ultimately serve as a trap bushing when its respective fixture is ultimately installed. The free end of the pipe is closed by a wafer cap. The wafer cap comprises a relatively thin plastic cap, solvent, welded or otherwise sealingly affixed to the free end of the pipe. The necessary cleaning and welding steps are time consuming. Furthermore, while the air or water tests are performed at relatively low pressures, the wafer caps are characterized by a relatively high failure rate of from about 30% to about 35%.

Another prior art approach is to apply to the free end of the pipe or trap bushing affixed to the center port of the T-fitting, a resilient rubber cap held in place by a hose clamp. Unlike the wafer cap, this type of closure has the advantage of being reusable. Nevertheless, its installation is time consuming, it is frequently lost or misplaced, and it, too, demonstrates a relatively high failure rate.

Today most basic plumbing of the type to which the present invention is directed is accomplished with so-called "schedule 40" pipe and pipe fittings. Pipe and fittings of this type are conventional, readily available, and well known in the art. The term "schedule 40" refers to the thickness or gauge of the pipe wall. Schedule 40 pipe and its fittings come in several sizes, as is well known in the art.

Yet another approach by prior art workers is to close the free end of the trap bushing or pipe extending from the center port of the T-fitting and through the wall by a schedule 40 cap. This is a relatively heavy-duty cap structure which is glued or solvent welded to the free end of the pipe. The cap is expensive, must ultimately be removed, and constitutes a single use item.

The present invention relates to a test closure plug which, in combination with a conventional adapter and adapter nut, can be used to close and seal the free end of the pipe or trap bushing attached and sealed to the intermediate port of the T-fitting. The test closure plug of the present invention overcomes the problems associated with the various prior art devices for this purpose. Once installed, the test closure plug of the present invention will easily withstand a head of water or a water test or air test. When it is time to install the fixture, the test closure plug can be removed from the pipe or trap bushing and the adapter thereon by removal of the adapter nut. The adapter, the adapter nut and the adapter washer (whether it be a separate washer or an integral part of the nut) can be used to connect the trap to the trap bushing by a slip joint, well known in the art. The test closure plug can be reused again and again. The plug is characterized by excellent strength and is easy and inexpensive to manufacture. It will be apparent that the test closure plug of the present invention provides a closing and sealing device for the intermediate port of the T-fitting which is both reliable, safe and easily installed.

DISCLOSURE OF THE INVENTION

According to the invention there is provided a plumbing fitting comprising a test closure and plug for the free end of a pipe or trap bushing mounted in the center part of a T-fitting, the T-fitting constituting a part of a soil pipe and vent pipe assembly of an overall plumbing system.

The free end of the trap bushing is provided with an adapter. The adapter is conventional, having a main body portion, a washer and a nut. The first end of the adapter has an internal diameter to receive the free end of the trap bushing with a sliding fit. The free end of the trap bushing is sealingly attached within the adapter by gluing, solvent welding, or the like. The remainder of the adapter terminates in a second end, is externally threaded, and is provided with an interior diameter equal to the interior diameter of the trap bushing. The interior diameters of this remainder of the adapter and the trap bushing are adapted to receive the connecting portion of the trap with a close tolerance sliding fit. The second end of the adapter is provided with an annular inwardly sloped conical surface. The adapter washer is provided with an exterior mating surface and an interior cylindrical surface having an interior diameter closely matching the exterior diameter of the connecting portion of the trap. The connecting portion of the trap is inserted through the adapter nut, the adapter washer and into the adapter and the trap bushing. The adapter nut has a flange which engages the annular forward surface of the adapter washer. As the nut is tightened, the washer matching surface is urged against the tapered surface of the second opening of the adapter. This causes a seal to be formed between sloping surfaces of the adapter and the washer and simultaneously causes the cylindrical surface of the washer to form a seal against the outer surface of the connecting portion of the trap, and to clamp the connecting portion of the trap.

Before installation of the trap, the adapter washer may be removed and the plug of the present invention substituted therefore. The plug is provided with an annular surface which matches the tapered surface of the second opening of the adapter. When the adapter nut is tightened, the plug closes the opening in the adapter nut and forms a seal with the tapered surface of the adapter second end. The plug enables pressure testing of the plumbing system, or the maintenance of a head of water therein. When the fixture is installed and its trap is to be connected to the trap bushing and T-fitting, the adapter nut and the plug are removed from the adapter, the adapter washer is substituted for the plug, and a fluid tight seal is made with the connecting portion of the trap in the manner just described forming a slip joint between the adapter and the connecting portion of the trap. The plug may thereafter be used again.

In some instances, the adapter is of the type wherein its washer comprises an integral, one-piece part of the nut. In this instance, a modified plug of the present invention is used having an annular flange rather than a tapered surface, the annular flange cooperating with the integral washer of the nut.

DETAILED DESCRIPTION OF THE INVENTION

Figure 1:
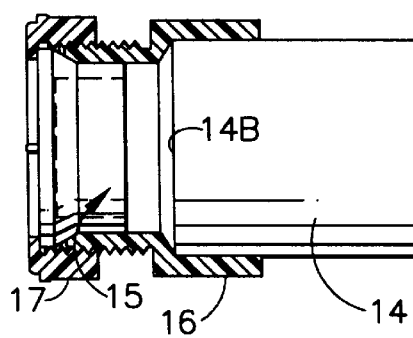
FIG. 1 is a fragmentary view, partly in cross-section, illustrating the test closure plug of the present invention serving as a closure seal for the free end of a pipe or trap bushing mounted and sealed in the intermediate port of the T-fitting of a vent pipe and soil pipe assembly.
Figure 1:
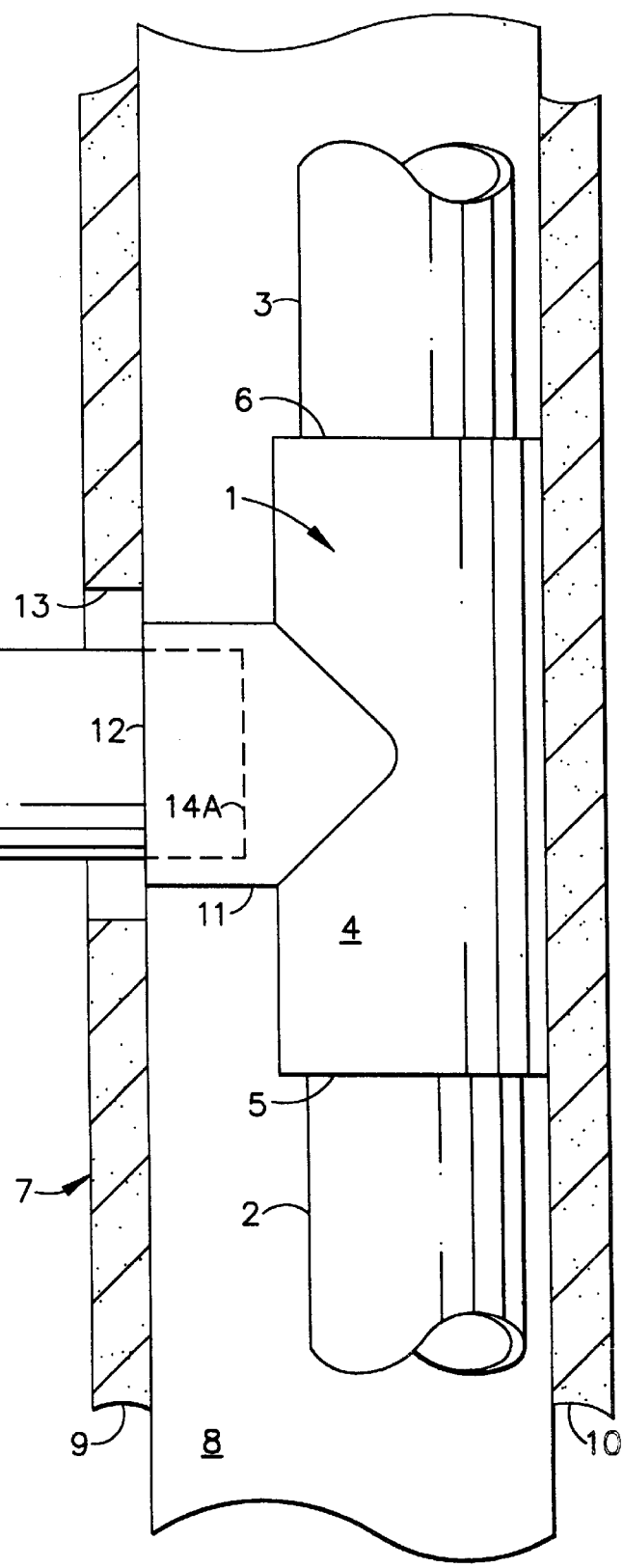

In all of the Figures, like parts have been indicated by like index numerals. Reference is first made to FIG. 1 wherein an exemplary installation of the test closure plug of the present invention is illustrated. A conventional soil pipe and vent pipe assembly is shown, generally indicated at 1. The assembly 1 is made up of a soil pipe 2, a vent pipe 3 and a T-fitting 4. The soil pipe 2 and vent pipe 3 are connected to the aligned ports 5 and 6, respectively, of the T-fitting 4. The assembly 1 is shown mounted within a partition wall generally indicated at 7. The partition wall 7 comprises a plurality of vertical joists, one of which is shown at 8, supporting drywall panels 9 and 10.

The T-fitting 4 has a central branch 11 providing a central port 12. The central port 12 of the central branch 11 of T-fitting 4 is accessible through an opening 13 in wall panel 9.

For purposes of this exemplary showing, let it be assumed that the soil pipe 2 and the vent pipe 3 are 1.5 inch (nominal internal diameter) schedule 40 plastic pipes which are well known and readily available, and that the T-fitting is a schedule 40 T-fitting therefor. The ports 5, 6 and 12 of T-fitting 4 would have an internal diameter to slidingly receive the 1.9 inch outside diameter of soil pipe 2 and vent pipe 3 with close tolerance, enabling fluid-tight connections between soil pipe 2, vent pipe 3 and T-fitting 4 by solvent welding or the like.

The central port 12 receives a piece of schedule 40 pipe 14 identical to soil pipe 2 and vent pipe 3 in inner and outer diameters. The adjacent end 14A of pipe 14 may be mounted within central port 12 of T-fitting 4 in a fluid-tight fashion, as by solvent welding or the like. The pipe 14 extends through wall panel opening 13 and may be cut to any desired length, resulting in a free end 14B. The pipe 14 is intended to serve as a trap bushing, as will be apparent hereinafter. Until a fixture with a trap is located in place, the free end 14B of pipe or trap bushing 14 is sealed by a plug of the present invention generally indicated at 15, held in place by a conventional prior art adapter 16 and adapter nut 17.

Figure 2:
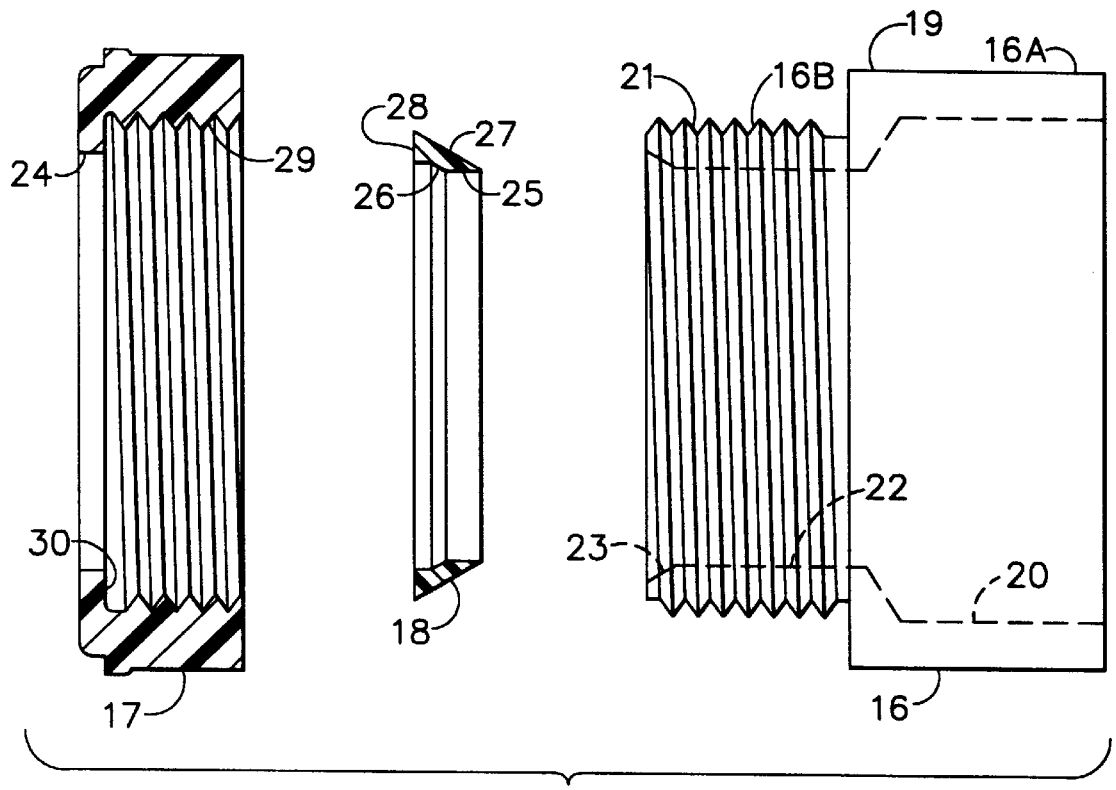
FIG. 2 is a side elevational view, partly in cross-section, illustrating an exemplary prior art adapter together with its washer and nut.

Reference is now made to FIG. 2 which illustrates an exemplary prior art adapter. The adapter 16 is provided with nut 17 and a washer 18. Adapter 16 has a first body portion 16A and a second body portion 16B. The portion 16A has a cylindrical outer surface 19 and a cylindrical inner surface 20. The portion 16B of adapter 16 has an outer cylindrical threaded surface 21 and a cylindrical interior surface 22 with an inwardly sloped, tapered annular surface 23. Adapters of this type are usually molded of ABS or PVC plastic material. The same is true of nut 17.

For purposes of this description let it be assumed that adapter 16 is intended to be used with 1.5 inch schedule 40 pipe. To this end, the cylindrical inner surface 20 of adapter portion 16A will have a diameter to receive the 1.9 inch outside diameter of trap bushing 14 with a sliding fit with close tolerance enabling a fluid-tight connection to be made with the trap bushing 14 by solvent welding or the like.

The diameter of the inside cylindrical surface 22 of the portion 16B of adapter 16 is sized to receive the connecting portion of a tubular trap with a close tolerance sliding fit. The connecting portion of the trap is inserted through an opening 24 in one end of nut 17. The opening 24 just nicely receives the connecting portion of the trap. The tubular connecting portion of the trap thereafter is caused to pass through washer 18. The inside cylindrical surface 25 of washer 18 receives the connecting portion of the trap with a close tolerance sliding fit. The washer 18 may be provided with a chamfer 26 to assist in locating the washer on the connecting portion of the trap. Thereafter, the connecting portion of the trap is inserted into the adapter 16 through bore 22 and may extend partway into trap bushing 14.

It will be noted that the washer 18 has an exterior annular surface. The surface is a tapered surface closely matching the tapered surface 23 of adapter portion 16B. Finally, the washer 18 has a flat surface 28, the purpose of which will be apparent hereinafter.

Figure 5:
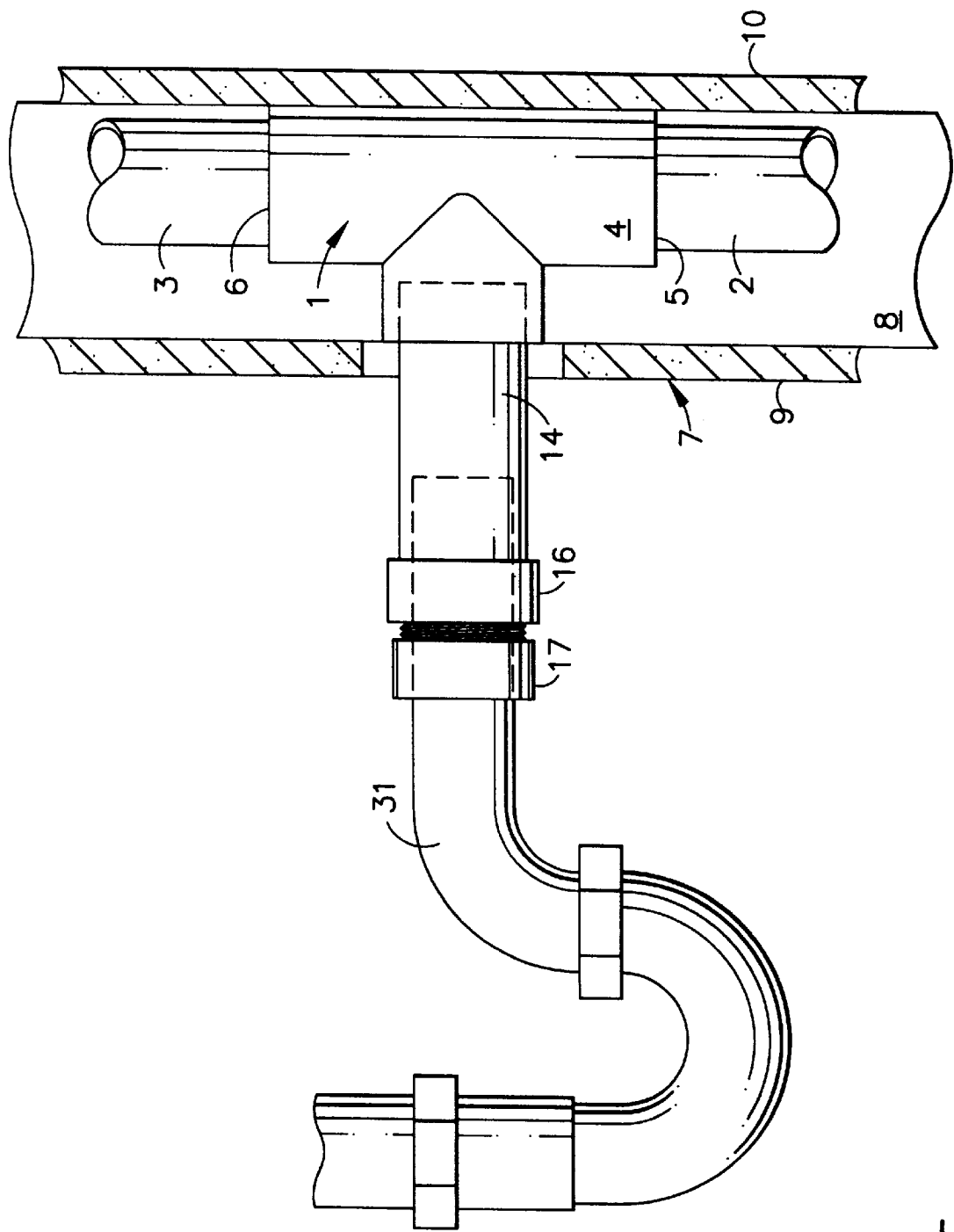
FIG. 5 is a fragmentary elevational view, partly in cross-section, illustrating the adapter used to sealingly attach the connecting portion of a trap to the free end of the trap bushing, the plug having been replaced by the adapter washer.

The nut 17 is internally threaded as at 29. The threads 29 are adapted to engage and cooperate with the threads 21 of adjacent ton 16B of adapter 16. Adjacent the opening 24, the nut 17 has an inner annular shoulder 30. Once the connecting portion of the trap has been introduced into the bore 22 of adapter 16 and located at the desired depth within the bore 22, the nut 17 will be engaged upon the threads 21 of the adapter. As the nut is tightened, the annular shoulder 30 thereof will engage the surface 28 of the washer. This, in turn, causes the tapered surface 27 of the washer to engage the tapered surface 23 of the portion 16B of adapter 16 with a wedging action. This wedging action results in a fluid-tight seal between the surface 25 of the washer and the exterior surface of the attachment portion of the trap. Similarly, a fluid-tight seal is formed between the adapter surface 23 and the washer surface 27. As a result of this, the trap is not only connected to the trap bushing with a fluid-tight seal created by washer 18, but is also clamped in place by washer 18. This is illustrated in FIG. 5 wherein a conventional tubular trap is shown at 31 clamped and sealed by adapter 16 to the trap bushing 14. FIG. 5 illustrates a typical trap connection, well known in the art.

As indicated above, during construction and prior to the installation of a fixture, it is generally desirable to close and seal the free end of trap bushing 14. This not only prevents dirt and foreign matter from entering the plumbing system via the free end of trap bushing 14, but also enables the overall plumbing system to be subjected to air and water testing. It also enables a head of water to be maintained in the overall system.

Figure 3:
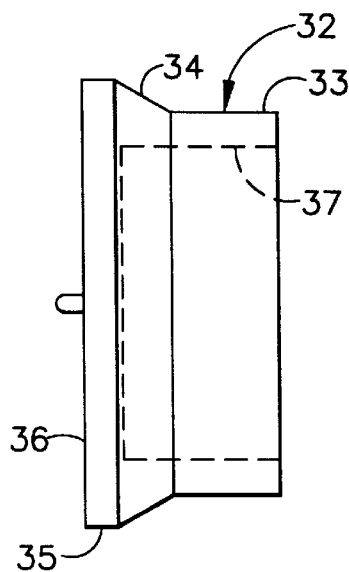
FIG. 3 is a side elevational view of a first embodiment of the test closure plug of the present invention.

The present invention is based upon the discovery that the same adapter 16 and nut 17 by which the trap 31 will ultimately be connected to trap bushing 14 can also serve to temporarily seal the free end of the trap bushing 14 prior to installation of trap 31. This is accomplished through the use of the plug of the present invention, a first embodiment of which is illustrated in FIG. 3. The plug is generally indicated at 32 and has a first cylindrical portion 33 with an outside diameter equivalent to the outside diameter of the connecting portion of trap 31 (see FIG. 5). The portion 33 is followed by an outwardly tapered portion 34. The outer surface of portion 34 is essentially the same as the outer surface 27 of washer 18. The portion 34 leads to a second cylindrical portion 35 which, in turn, terminates at the closed end 36 of plug 32. Plug portions 33 and 34 are hollow, by virtue of blind bore 37. The plug 32 lends itself well to being molded of an appropriate plastic material having adequate strength characteristics. Excellent results have been achieved with polypropylene.

Figure 4:
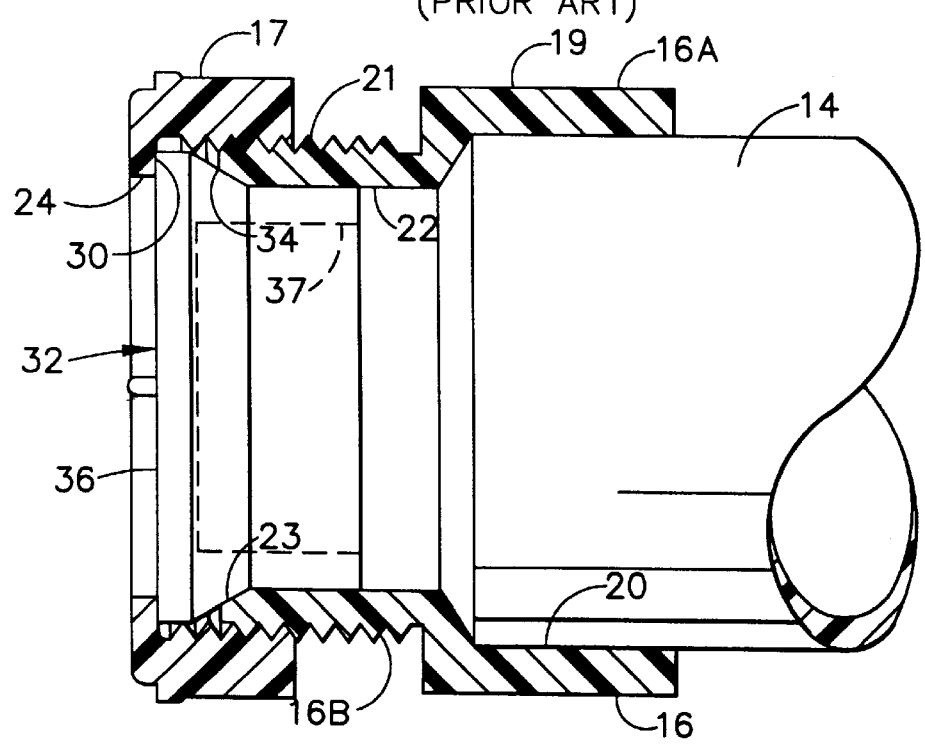
FIG. 4 is an enlarged, fragmentary side elevational view of the trap bushing, the adapter and nut of FIG. 2 and the test closure plug of FIG. 3 in assembly to sealingly close the free end of the trap bushing.

FIG. 4 illustrates the manner in which the plug 32 seals trap bushing 14. The adapter 16 is affixed to the free end of trap bushing 14 by solvent welding or the like, as described heretofore. In this instance, however, the plug 32 is substituted for the washer 18, normally used with adapter 16. The portion 33 of plug 32 is inserted in the bore 22 of the adapter portion 16B. Insertion of the plug 32 into bore 22 will stop upon abutment of the tapered surface 34 of the plug against the tapered surface 23 of adapter portion 16B.

With the plug 32 in place, the nut 17 is threadedly engaged on the portion 16B of adapter 16 and tightened thereon. As is shown in FIG. 4, the annular shoulder 30 of the nut will engage the closed end 36 of the plug. Further tightening of nut 17 will force the tapered plug surface 34 hard against the tapered surface 23 of the portion 16B of adapter 16 forming a fluid-tight seal therebetween.

When it becomes time to sealing mount trap 31 to trap bushing 14, it is only necessary to remove nut 17 and plug 32. Washer 18 (see FIG. 2) is substituted for plug 32 and the trap is sealingly attached to the trap bushing in the manner described above. Plug 32 may be reused.

Figure 6:
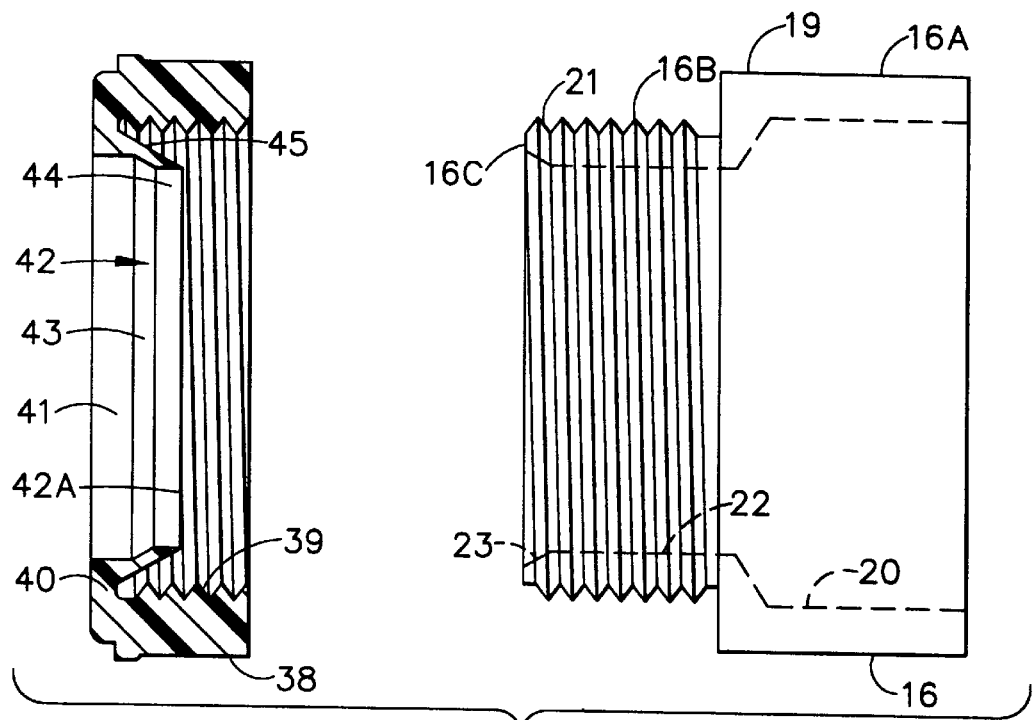
FIG. 6 is an exploded view of a prior art adapter and nut of the type wherein the adapter washer constitutes an integral, one-piece part of the nut.

Prior art workers have devised an adapter, substantially identical to that shown in FIG. 2, wherein the washer constitutes an integral, one-piece part of the nut. Such a prior art nut and adapter assembly is illustrated in FIG. 6. Since the adapter is identical to the adapter 16 of FIG. 2, it will be given like index numerals. The nut 38 is internally threaded as at 39, the threads 39 being adapted to cooperate with the threads 21 of adapter portion 16B. Plug 38 is provided with an inturned annular flange 40 defining a perforation 41. The integral, one-piece washer is generally indicated at 42 and extends from the inside surface of flange 40. The washer 42 has an inner lead-in surface 43 and a cylindrical surface 44 of a diameter to receive the connecting portion of the tubular trap 31 (see FIG. 5) with a close tolerance sliding fit. The integral, one-piece washer 42 is completed by being provided with a tapered outer surface configured to cooperate with the surface 23 of the portion 16B of adapter 16.

When the adapter 16 and nut 38 are used to sealingly join the connecting portion of trap 31 (see FIG. 5) to the trap bushing 14, the trap connecting portion is first inserted through the opening 41 in nut 38 and the cylindrical portion 44 of integral washer 42. The lead-in surface 43 assists in the insertion of the trap connecting portion through cylindrical washer surface 44. This is a close tolerance sliding fit. The trap connecting portion is then inserted through cylindrical bore 22 of the portion 16B of trap 16. Again this is a close tolerance sliding fit. The connecting portion of the trap may additionally extend partway into the trap bushing as is shown in FIG. 5. When the nut 38 is tightened on the adapter threads 21, the tapered surface 45 of integral washer 42 will engage the tapered surface 23 of the portion 16B of adapter 16 forming a fluid-tight seal therebetween. Simultaneously, the cooperation of tapered surfaces 45 and 23 will press the cylindrical surface 44 of integral washer 42 against the outer surface of the connecting portion of trap 31 not only clamping the trap in place, but also forming another fluid-tight seal between the integral washer 42 and the connecting portion of trap 31, in much the same way as was described with respect to the fluid sealing and clamping action of the elements of FIG. 2.

When the nut 38 having a washer 42 constituting an integral, one-piece part thereof is used, a second embodiment of the plug of the present invention is required to seal the end of the trap bushing 14 during construction. This second embodiment is generally indicated at 46 in FIG. 7.

The plug 46 has a cylindrical body 47 with an open end 48 and a closed end 49. The open and closed ends are formed by the blind bore 50. Like the plug 32 of FIG. 3, the plug 46 lends itself well to being molded of an appropriate plastic such as polypropylene. At its closed end 49, the plug 46 has an annular flange 51.

Figures 7, 8:
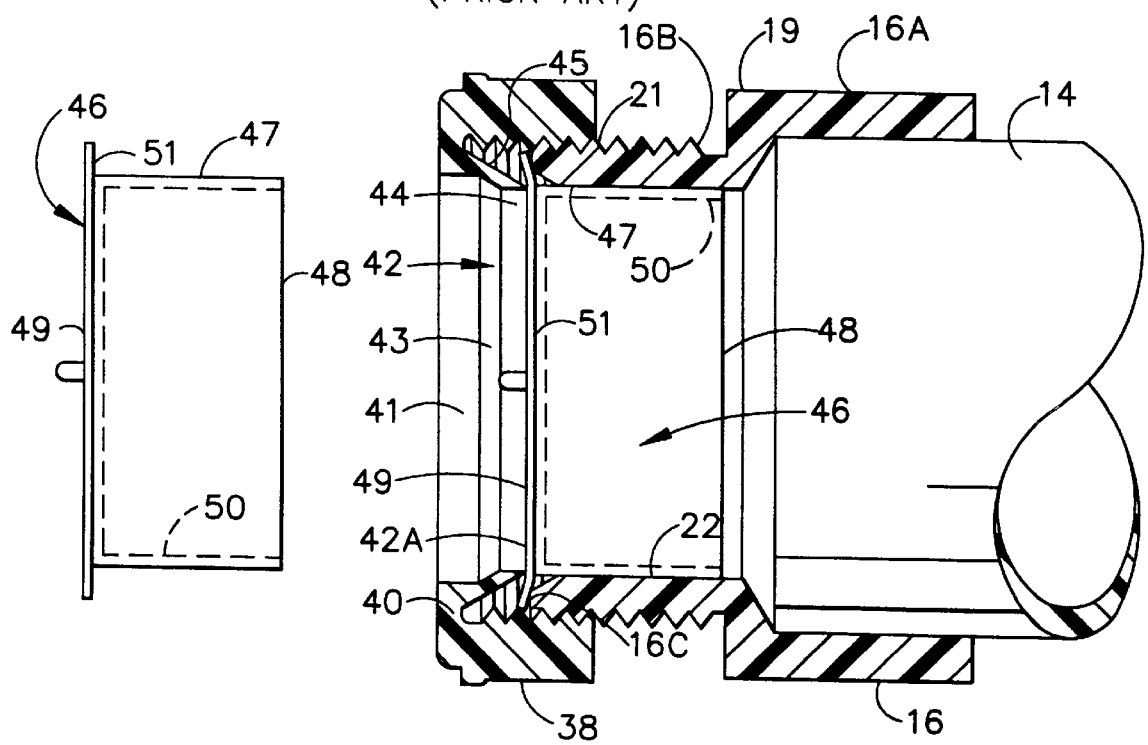
FIG. 7 is a side elevational view of a second embodiment of the plug of the present invention.
FIG. 8 is a fragmentary cross-sectional, side elevational view of the elements of FIG. 6 and the plug of FIG. 7 in assembled condition.

FIG. 8 shows the manner in which the plug 46 can be used to close and seal the trap bushing 14, it being understood that the adapter assembly 16 is mounted and sealed upon the free end of trap bushing 14. The plug 46 is inserted in the cylindrical bore 22 of adapter 16 with a close tolerance sliding fit. Thereafter, nut 38 is threadedly engaged on the threads 21 of the portion 16B of adapter 16. As the nut is tightened, the innermost annular edge 42A of the integral washer 42 will bear against the closed end 49 of plug 46 forming a seal therewith. In addition, the plug annular flange 51 will be pressed against and will form a seal with the adjacent annular edge 16C of the adapter portion 16B. The assembly illustrated in FIG. 8 will withstand both air and water tests and will permit a head of water to be maintained within the overall plumbing system. When it is time to install a fixture and connect its trap to the trap bushing 14, it is only necessary to remove nut 38 and plug 46 and then the trap may be installed in the manner described above. Again, the plug 46 can be reused.

Figure 9:
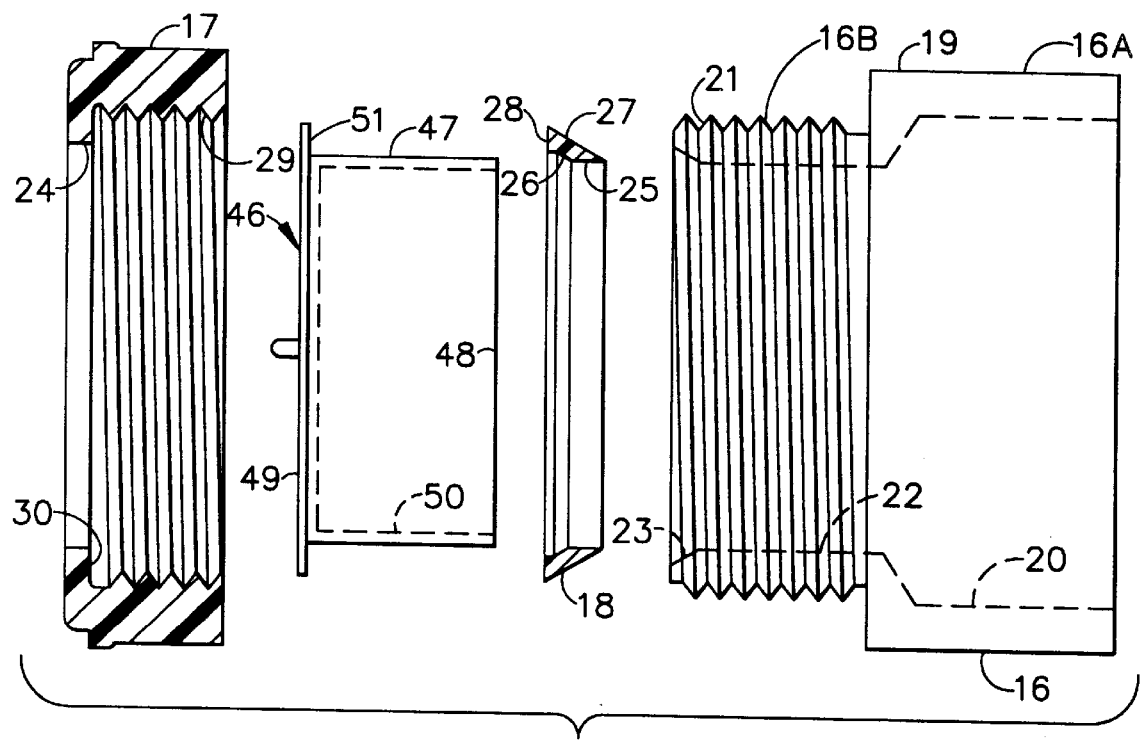
FIG. 9 is an exploded view of the adapter, nut and washer of FIG. 2 in combination with the plug of FIG. 7.
Figure 10:
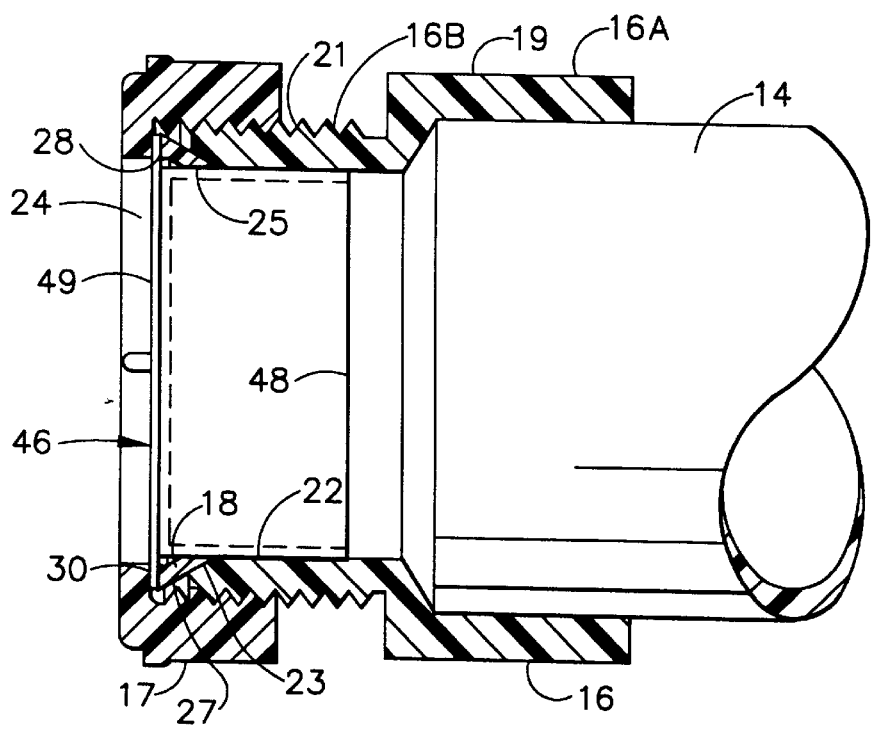
FIG. 10 is a fragmentary assembly view of the elements of FIG. 9.

It is possible to use the plug 46 of FIG. 7 in combination with the adapter 16, nut 17 and washer 18 of FIG. 2. This is illustrated in FIGS. 9 and 10. Since the adapter, washer and nut of FIGS. 9 and 10 are the same as those of FIG. 2, like parts have been given the same index numerals. In similar fashion, since the plug of FIGS. 9 and 10 is identical to the plug of FIG. 7, again like parts have been given the same index numerals.

In the embodiment of FIGS. 9 and 10, the washer 18 is slipped onto the outer cylindrical surface 47 of plug 46. The main body of the plug 46 is received in the cylindrical portion 25 of the washer 18 with a close tolerance sliding fit. The washer 18 is so located on plug 46 that its annular end surface 28 abuts the annular flange 51 of plug 46. A comparison of FIGS. 9 and 10 with FIG. 3 will show that the combination of plug 46 and washer 18 converts the plug 46 to a structure quite similar to the plug shown in FIG. 3. In fact, the assembly of the parts is substantially identical to that described with respect to FIG. 4. To this end, the plug is introduced into the bore 22, there being a close sliding fit therebetween. The plug is introduced until seated with the tapered surface 27 of washer 18 abutting the tapered surface 23 of portion 16B of adapter 16. Thereafter, the nut 17 is engaged with the threads 21 of adapter portion 16B and tightened. As the nut is tightened, a fluid seal is formed between tapered surface 27 of washer 18 and tapered surface 23 of adapter portion 16B. Simultaneously, a seal is formed between cylindrical surface 25 of washer 18 and the cylindrical surface 47 of plug 46. The sealed plug will enable both water testing and air testing and the maintenance of a head of water in the overall plumbing system. When a fixture is to be installed and its trap is to be connected with the trap bushing 14, it is only necessary to remove nut 17 and the assembly of plug 46 and washer 18. The washer 18 is removed from the plug and reinserted in the tapered recess 23 of adapter portion 16B. The connecting portion of tubular trap 31 is inserted through the hole 24 in nut 17, the bore 25 in washer 18, the bore 22 in adapter portion 16B and partway into the bore of the trap bushing 14. When the nut is tightened on the threads 21 of adapter portion 16B, the washer will form a seal between its tapered annular surface 27 and the tapered annular surface 23 of adapter portion 16B. Simultaneously, a seal will be formed between the annular washer surface 25 and the exterior surface of the connecting portion of trap 31. This last mentioned seal will also clamp the connecting portion of trap 31 in place. Since, in this embodiment, the washer 18 is used both with the plug 46 and the connecting portion of trap 31, the likelihood of loosing the washer is eliminated.

The embodiments described have been described in terms of 1.5 inch schedule 40 pipe and a tubular trap. Other pipe sizes with appropriately sized T-fittings, adapters and the like may also be used. When this is the case, it will be understood that the plug embodiments of the present invention will be properly sized to be used with such pipe and fittings.

Since the embodiments of the present invention utilize an adapter which is solvent welded or otherwise appropriately affixed to the pipe or trap bushing 14, there is no necessity at the time of installation of the fixture to go through time consuming cleaning and solvent welding fittings together. The trap bushing 14 has already been cut to length. As a consequence, the use of the plug of the present invention saves time and labor. Both embodiments of the plug are reusable and are simple and inexpensive to manufacture.

Numerous additional modifications may be made without departing from the spirit of the invention. For example, the portion 16A of adapter 16 could be so sized and configured as to be directly received and solvent welded or otherwise affixed to the central port of T-fitting 4. In such an instance, the portion 16B of the adapter would also serve as the trap bushing. Another modification commonly found in the prior art is to attach a trap bushing to a 90° fitting or other commonly used fitting such as a cross fitting or the like. No matter what type of fitting the trap is attached to, the plugs will be used and will function in the same manner described herein.

What is claimed:

1. A reusable test closure plug in combination with an adapter assembly for temporarily sealing, prior to the installation of a trap, the free end of a trap bushing, said trap bushing being sealingly connected to a port of a fitting constituting a part of a soil pipe and vent pipe assembly of a plumbing system, said free end of said trap bushing having affixed thereto said adapter assembly for receiving, sealing and clamping a trap to said trap bushing, said adapter assembly comprising an adapter affixed to said trap bushing in fluid-tight fashion, a nut threadedly engagable on said adapter and a washer shiftable by said nut to a sealing and clamping position, said plug being configured to cooperate with at least said adapter and said nut to sealingly close said free end of said trap bushing for the purpose of at least one of water testing, air testing, and maintaining a head of water in said plumbing system.

2. The plug and adapter assembly claimed in claim 1 wherein said plug is so configured as to serve as and take the place of said washer of said adapter assembly.

3. The plug and adapter assembly claimed in claim 2 wherein said adapter is of the type having first and second portions, said first adapter portion being externally threaded with a cylindrical interior surface, said first adapter portion having a first end terminating in an annular planar surface perpendicular to the axis of said adapter, said inner cylindrical surface being connected to said planar annular first end surface by an inner annular tapered surface, said second end of said first adapter portion being connected to said second adapter portion, said second adapter portion being sealingly affixed to said free end of said trap bushing said plug having an open end and a closed end, said plug having a first cylindrical portion extending from said open plug end and terminating in an annular tapered surface corresponding to said tapered surface of said first adapter portion, said annular tapered surface of said plug leading to a second cylindrical surface of said plug, said second cylindrical surface terminating at said closed plug end, said nut of said adapter assembly being internally threaded and having at one end an inwardly directed flange defining an opening, said plug first cylindrical portion being receivable within said inner cylindrical surface of said first adapter portion with a close tolerance sliding fit and with said annular tapered surface of said plug abutting said annular tapered surface of said first adapter portion, said annular flange of said nut engaging said closed end of said plug as said nut is threaded onto said adapter first portion forcing said tapered surfaces into a fluid-tight seal.

4. The plug and adapter assembly claimed in claim 1 wherein said plug also cooperates with said washer of said adapter assembly.

5. The plug and adapter assembly claimed in claim 4 wherein said adapter is of the type having first and second portions, said first portion being externally threaded with a cylindrical interior surface, said first adapter portion having a first end terminating in an annular planar surface perpendicular to the axis of said adapter, said inner cylindrical surface being connected to said planar annular first end surface by an inner annular tapered surface, said second end of said first adapter portion being connected to said second adapter portion, said second adapter portion being sealingly affixed to said free end of said trap bushing, said adapter assembly washer having a tapered outer surface corresponding to said tapered inner surface of said first adapter portion, said washer having an inner cylindrical surface of substantially the same diameter as said inner cylindrical surface of said first adapter portion, said nut of said adapter assembly being internally threaded and having at one end an inwardly directed flange defining an opening, said plug comprising a hollow cylindrical structure having an open end and a closed end, said plug having an annular external flange at said closed end, said washer being mountable on said plug adjacent said flange thereof with a close tolerance sliding fit, said cylindrical plug being receivable within said inner cylindrical surface of said first adapter portion with a close tolerance sling fit and with said outer annular tapered surface of said washer abutting said annular inner surface of said first adapter portion, said annular flange of said nut engaging said closed end of said plug as said nut is threaded onto said adapter first portion forcing said tapered surfaces into a fluid-tight seal and forcing said cylindrical inner surface of said washer against said cylindrical outer surface of said plug forming a fluid-tight seal therebetween.

6. The plug and adapter assembly claimed in claim 4 wherein said adapter is of the type having first and second portions, said first portion being externally threaded with a cylindrical interior surface, said first adapter portion having a first end terminating in an annular planar surface perpendicular to the axis of said adapter, said inner cylindrical surface being connected to said planar annular first end surface by an inner annular tapered surface, said second end of said first adapter portion being connected to said second adapter portion, said second portion being sealingly affixed to said free end of said trap bushing, said nut of said adapter assembly being internally threaded and having at one end an inwardly directed flange defining an opening, said adapter assembly washer having an annular tapered outer surface corresponding to said tapered inner surface of said first adapter portion, said washer having an inner cylindrical surface of substantially the same diameter as said inner cylindrical surface of said first adapter portion, said washer comprising an integral one-piece part of said nut, said integral washer extending within said nut from said nut flange with its tapered outer surface facing and spaced from said nut threads, said washer having a free annular end edge formed by the juncture of said annular tapered surface and said cylindrical inner surface of said washer, said plug comprising a hollow cylindrical structure having an open end and a closed end, said plug having an annular external flange at said closed end, said cylindrical plug being receivable within said inner cylindrical surface of said first adapter portion with a close tolerance sliding fit and with said plug flange abutting said annular planar end surface of said first adapter portion, said free annular end edge of said integral washer abutting said closed end of said plug as said nut is threaded onto said adapter first portion forcing said plug annular flange against said annular planar end surface of said adapter forming a fluid-tight seal therebetween.

7. The plug and adapter assembly claimed in claim 1 wherein said adapter is molded of plastic material.

8. The plug and adapter assembly claimed in claim 1 wherein said plug is molded of plastic material.

9. The plug and adapter assembly claimed in claim 1 wherein said adapter is molded of plastic material chosen from the class consisting of PVC and ABS.

10. The plug and adapter assembly claimed in claim 1 wherein said plug is molded of polypropylene.

11. A test closure plug for use with an adapter assembly of the type used to sealingly attach a trap to a trap bushing, said adapter assembly constituting an adapter, a washer and a nut, said adapter having first and second portions, said first portion being externally threaded with a cylindrical interior surface, said first adapter portion having a first end terminating in an annular planar surface perpendicular to the axis of said adapter, said inner cylindrical surface being connected to said planar annular first end surface by an inner annular tapered surface, said second end of said first adapter portion being connected to said second adapter portion, said second adapter portion being sealingly affixed to said trap bushing, said plug having an open end and a closed end, said plug having a first cylindrical portion extending from said open plug end and being of a diameter such that said cylindrical portion is receivable within said adapter cylindrical surface with a close tolerance sliding fit, said plug cylindrical portion terminating in an annular tapered surface corresponding to said tapered surface of said first adapter portion, said annular tapered surface leading to a second cylindrical portion of said plug, said second cylindrical surface terminating at said closed plug end, said plug being substitutable for said washer when said trap bushing is to be closed for test purposes.

12. The plug claimed in claim 11 wherein said plug is molded of plastic material.

13. The plug claimed in claim 11 wherein said plug is molded of polypropylene.

14. A test closure plug for use with an adapter assembly of the type constituting an adapter, a washer and a nut, said adapter having first and second portions, said first portion being externally threaded with a cylindrical interior surface, said first adapter portion having a first end terminating in an annular planar surface perpendicular to the axis of said adapter, said inner cylindrical surface being connected to said planar annular first end surface by an inner annular tapered surface, said second end of said first adapter portion being connected to said second adapter portion, said second portion being sealingly affixed to said free end of said trap bushing, said plug having a cylindrical body with an open end and a closed end, said plug cylindrical body having an outside diameter receivable within said cylindrical interior surface of said adapter first portion with a close tolerance sliding fit, said plug cylindrical body having an annular exterior flange at said closed end.

15. The plug claimed in claim 14 wherein said plug is molded of plastic material.

16. The plug claimed in claim 14 wherein said plug is molded of polypropylene.

* * * * *